March 29, 1949.  M. H. STORCH  2,465,491
COMPACT AND THE LIKE
Filed Dec. 29, 1945 3 Sheets-Sheet 1
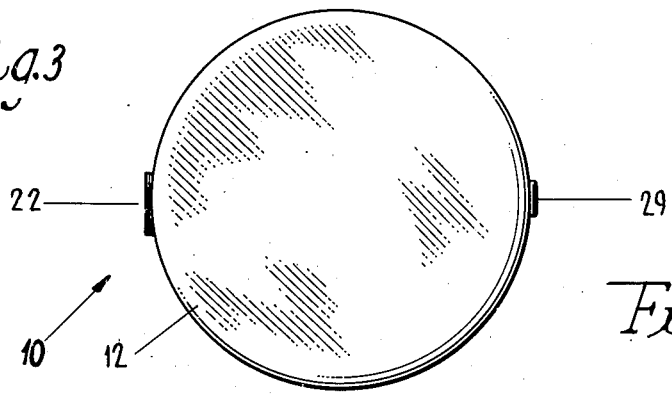
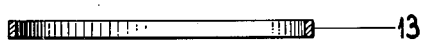
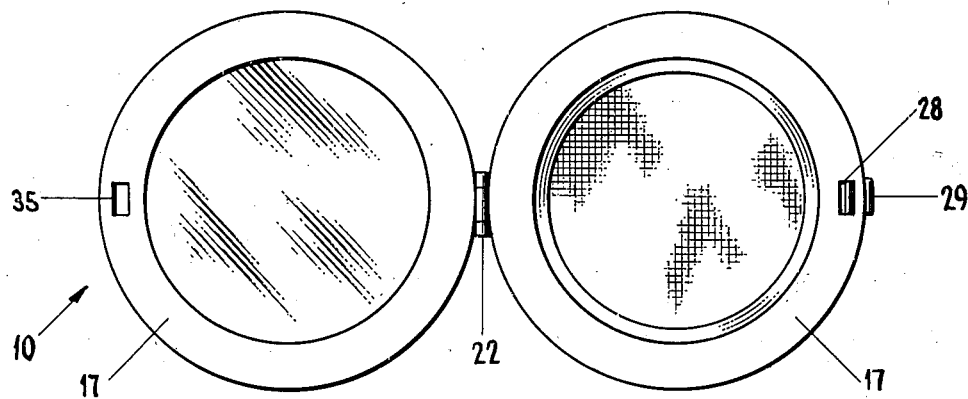
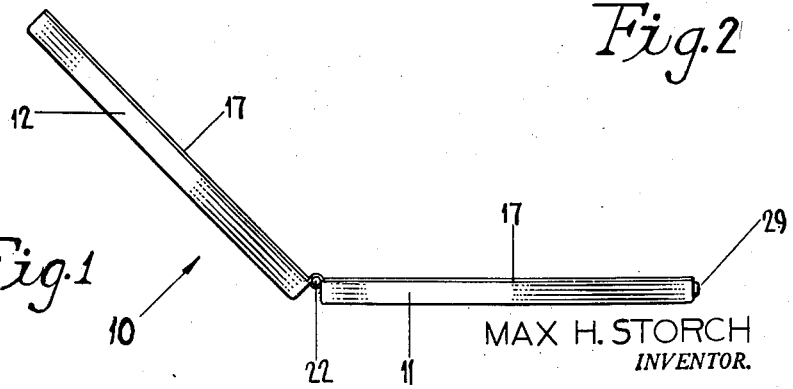
MAX H. STORCH
*INVENTOR.*
BY Joseph Blacker
ATTORNEY March 29, 1949.  M. H. STORCH  2,465,491
COMPACT AND THE LIKE
Filed Dec. 29, 1945  3 Sheets-Sheet 2

MAX H. STORCH
*INVENTOR.*

BY *Joseph Blacker*
ATTORNEY

March 29, 1949.　　　M. H. STORCH　　　2,465,491
COMPACT AND THE LIKE

Filed Dec. 29, 1945　　　3 Sheets-Sheet 3

MAX H. STORCH
*INVENTOR.*

BY Joseph Blacker
AT TORNEY

Patented Mar. 29, 1949

2,465,491

UNITED STATES PATENT OFFICE 2,465,491

COMPACT AND THE LIKE

Max H. Storch, Belle Harbor, N. Y.

Application December 29, 1945, Serial No. 638,072

2 Claims. (Cl. 132—82)

1

This invention relates to the construction of compacts and the like.

An object of this invention is to provide a composite receptacle comprising dished plastic lining members carrying the contents of the receptacle and metallic cover members into which the lining members closely fit, the outer edges of the metal cover members being rolled over the outer edges of the plastic lining members to hold the lining members in unitary relation with the cover members.

Another object of this invention is to provide an annularly flanged metallic sealing member having an annular plastic member fitting around the annular portion thereof and being inturned over the annular plastic member, the flanged member extending into the lower plastic lining member and stopping short of the base portion of the lower lining member and providing a circular recess between the members wherein a reticulated powder covering sifter member having a circular outer form of a slightly larger diameter than the internal diameter of the annularly flanged sealing member may be mounted and frictionally held in the circular recess.

Another object of this invention is to provide an annularly flanged metallic sealing member having an annular plastic member fitting around the annular portion thereof and being inturned over the annular plastic member, the flanged member extending into the upper plastic lining member and stopping short of the disk-like surface of the upper lining member and providing a circular recess between the upper members wherein a mirror may be mounted and frictionally held therebetween.

Another object of this invention is to provide annular plastic members fitting around the annularly flanged sealing members for permanently securing the flanged sealing members to the plastic lining members.

Another object of this invention is to provide a modified arrangement whereby an annular leaf spring in the circular recess between the members holds the reticulated powder sifter member with a mechanical grip.

The importance of providing annular plastic members fitting around the external peripheral surfaces of the flanged metallic sealing members is that in practice it is found that when two metallic surfaces are cemented together there is no permanency in the junction thus formed. In the constructions herein disclosed the junction is made by cementing a plastic member against another plastic member and this form of structure provides a permanently reliable junction.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a side elevation of the compact in open position.

Figure 2 is a top plan view of the compact in open position.

Figure 3 is a top plan view of the compact in closed position.

Figure 4 is a central cross sectional view of an annular plastic member employed in the compact.

In the illustrated embodiment of the invention shown in Figures 1 to 8 inclusive, the numeral 10 indicates an assembled compact for powder or the like. The compact 10 comprises a dished bottom cover member 11 and a dished top cover member 12, both made of metal.

Figure 8:
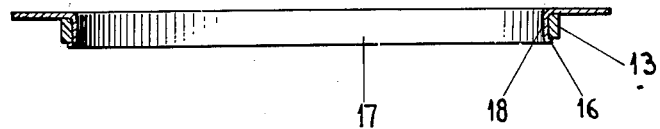
Figure 8 is a central cross sectional view of one of the flange sealing members.
Figure 7:
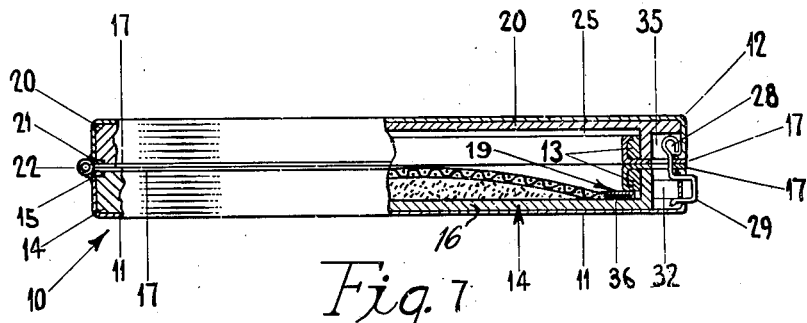
Figure 7 is an enlarged central cross sectional view of the compact partly broken away to show the interior thereof.

The bottom cover member 11 carries a dish-shaped plastic lining member 14 which fits around an annular plastic member 13. As shown in Figure 7, the upper edge 15 of the metal bottom cover member 11 is inturned over the outer upper edge of the plastic lining member 14.

The compact 10 comprises two annular plastic members 13. The annular plastic members 13 respectively fit around the annular extensions 18 of the members 17. Each annular extension 18 has a peripheral edge 16. The edge 16 is turned over the annular plastic member 13. One of the sealing members 17 is mounted on the plastic lining member 14. The plastic member 13 is then cemented to the plastic lining member 14. The sealing member 17 of the bottom cover member 11 extends downwardly with respect to the lining member 14 and stops short of the base portion of the lining member 14 and provides a circular recess 19. It is to be noted from the drawings, that the lower lining member 14 has a base portion 16 which is bodily intact and unperforated.

The top cover member 12 carries a dish-shaped plastic lining member 20. As shown in Figure 7, the lower edge 21 of the metal top cover 12 is inturned over the lower edge of the plastic lining member 20 so as to hold the lining member 20 in unitary relation with the top cover member 12.

One of the annular plastic members 13 fits around the annular extension 18 of the sealing member 17. The free edge of the extension 18 is turned over the annular plastic member. The sealing member 17 is mounted into the upper plastic lining member 20. The plastic member 13 is then cemented to the plastic lining member 20. The upper and lower annular extensions 18 are of the same internal diameter and define the interior wall of the compact.

The annular extension of the sealing member 17 extends upwardly with respect to the lining member 20, and stops short of the disk-like upper surface of the lining member 20 and provides a circular recess 25 for a mirror 26.

The top and bottom sealing members 17 have side edge portions coiled to form a hinge 22, as is well known in the art.

In order to close the compact there is provided a spring actuated catch 28 shown integral with a flanged and hollow finger piece 29. The body of the finger piece extends outwardly through an opening 30 in the circular wall of the bottom cover member 11.

The flange 31 on the finger piece is larger than the opening 30 in the lower cover member 11. This flange limits the outward movement of the finger piece 29 from the lower cover member 11. A leaf spring 32 lies within a pocket 33 in the lower lining member 14 and forcibly contacts the finger piece and the upright wall 34.

The spring 32 exerts pressure against the finger piece 29 and holds the catch 28 in engagement with the outer wall defining an opening 35 in the upper lining member 20 defining the pocket 33. Inwardly directed pressure against the outer face of the finger piece 29 flexes the spring 32 and causes the catch 28 to disengage from the cover 12 to permit opening the compact 10.

It is to be noted that a reticulated disk-like powder sifter member 36 of slightly larger diameter than the inner diameter of the compact 10 is mounted in the circular recess 19. The height of the recess 19 is slightly less than the thickness of the outer edge portion of the sifter member 36 to cause the powder sifter member to be frictionally held in the recess 19.

Powder placed under the reticulated flexible central portion of the sifter member 36 may be daubed through the said member by means of a powder puff or the like.

It is to be noted that overedge stitching is employed around the periphery of the sifter member so that its peripheral edge is compacted and has a degree of rigidity, as is well known in the art.

Figure 10:
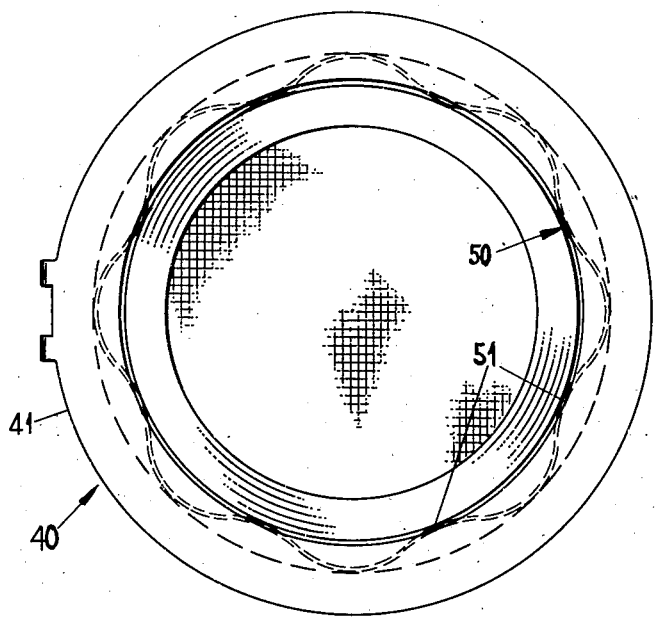
Figure 9 is an enlarged central cross sectional view of a modified compact partly broken away to show an annular leaf spring serving to grip a powder sifter member and Figure 10 is a top plan view of the lower body portion of the compact shown in Figure 9, showing a view of the leaf spring in dotted lines.
Figure 9:
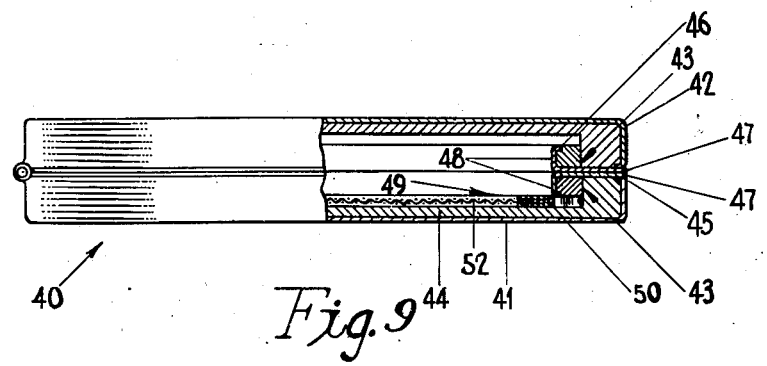

Figures 9 and 10 show a modified compact 40 comprising a dished bottom cover member 41 and a dished top cover member 42, both made of metal.

The bottom cover member 41 carries a dish-shaped plastic lining member 44, fitting tightly therein. The upper edge 45 of the metal bottom cover 41 is inturned over the outer upper edge of the plastic lining member 44 so as to hold the lining member 44 in unitary relation with the bottom cover member 41.

The compact 40 comprises two flanged metallic sealing members 47, 47 having annular extensions 48, in perpendicular relation to the flanged portions thereof.

The compact 40 also comprises two annular plastic members 43. Each annular plastic member 43 fits around the annular extension 48 of a sealing member 47. The free edge 46 of each of the members 47 is inturned over an annular plastic member 43.

One of the sealing members 47 is mounted in the plastic lining member 44 and the annular plastic member 43 is then cemented to the plastic lining member 44. The annular extension 48 of the member 47 extends downwardly into the member 44 and stops short of the horizontal base portion of the lining member 44 and provides a circular recess 49.

Figure 5:
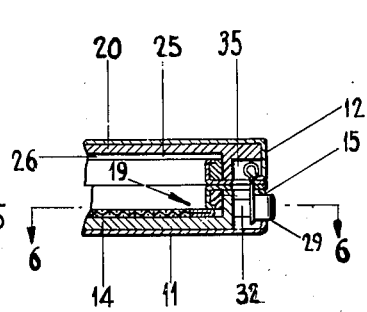
Figure 5 is a cross sectional view of a fragmentary portion of the compact, showing catch means for holding the body members of the compact in closed position.
Figure 6:
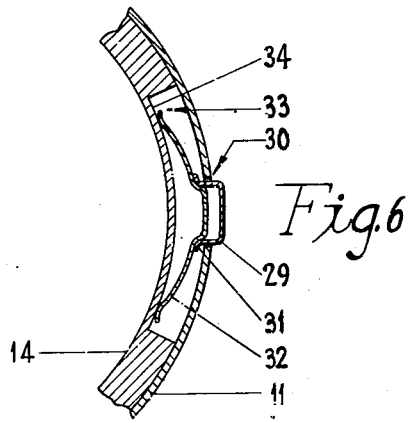
Figure 6 is a cross sectional view of a fragmentary portion of the compact, the section being taken as on line 6—6 in Figure 5.

It is to be noted that the circular recess 49 is much deeper or much larger in diameter than the circular recess 19 shown in Figure 5. The deep recess 49 serves as a receiver for an annular leaf spring 50.

The spring 50 is of corrugated annular form, the corrugations 51 being of a size so as to project radially inwardly into the interior of the compact. The inner circumference formed by the corrugations 51 is slightly smaller than the inner circumference of the interior of the compact, so as to form a plurality of resilient finger-like extensions.

A powder sifter member 52 is placed within the compact and within the circumference defined by the finger-like extensions. The sifter member 52 is of a diameter slightly larger than the inner diameter of the spring so that the sifter member is held by the spring with a mechanical grip.

It is to be noted that the structure defined in the modified compact 40 is similar to that shown for the compact 10 and needs no further description.

It is further to be noted that the exterior surfaces of the compacts 10 and 40 are preferably entirely of metal. The arrangement shown employs two plastic lining members for sanitary reasons; that is, so that the lining members may be washed. The arrangement whereby the metallic members are held in interlocked relation by cementing the plastic members provides a permanent positive grip of the outer metallic members.

It will thus be noted that the structure herein disclosed provides for permanently securing upper and lower metallic outer casing members by fixedly mounting two plastic members between them and then cementing the plastic members. It is to be noted that each casing member has mounted therein two plastic members which are cemented together. The structure also provides for holding a powder sifter member by frictionally contacting a superposed peripheral edge defining an annular recess, identified by 19 in Figure 5, and by 49 in Figure 9. Additionally, means is provided for mechanically holding the powder sifter member with a mechanical grip by finger-like resilient elements.

In accordance with the patent statutes I have described and illustrated the preferred embodiment of my invention, but it will be understood that various changes and modifications can be made therein without departing from the spirit of the invention as defined by the appended claims.

I claim:

1. A compact having dished body members and annular flanges inwardly of said body members, said compact having hinge means causing said flanges to meet in superposed contacting sealing relation to form a closed compartment and having catch means holding said members closed; said compact comprising dish-like metallic outer casing members, dished plastic lining members with bodily intact base portions mounted in said casing members and held therein by inturning the outer edges of said metallic casing members over said plastic lining members, annularly flanged metallic sealing members jointly forming the interior upright wall of said compact, annular plastic members fitting around the annular portion of said sealing members, said metallic sealing members being inturned over said annular plastic members, said annular plastic members being cemented to said plastic lining members, one of said sealing members mounted on the lower plastic lining member and stopping short of the base portion of said lining member and providing a circular recess between said members, for detachably mounting a powder covering sifter member therein to be frictionally held in said recess, said plastic lining members being washable of said powder, whereby said compact may be maintained clean and sanitary.

2. A compact having dished body members and hinge means causing their peripheral surfaces to meet in superposed sealing relation to form a closed compartment and having catch means holding said body members closed; said compact comprising two dish-like metallic outer casing members, dished plastic lining members mounted in said casing members and held therein by inturning the outer edges of said metallic casing members over said plastic lining members, annularly flanged metallic sealing members forming the interior wall of said compact, annular plastic members fitting around the annular portion of said sealing members, said metallic sealing members being inturned over said annular plastic members, said annular plastic members being cemented to said plastic lining members whereby each casing member has mounted therein two plastic members which are cemented together, one of said sealing members mounted on the lower plastic lining member and stopping short of the base portion of said lining member and providing a circular recess between said members, for detachably mounting a powder covering sifter member therein, said recess being of a height to cause said sifter member to be frictionally held in said recess, said plastic lining members being washable of said powder, whereby said compact may be maintained clean and sanitary.

MAX H. STORCH.

REFERENCES CITED

The following references are of record in the file of this patent:

UNITED STATES PATENTS

| Number | Name | Date |
| --- | --- | --- |
| 1,537,591 | Dodson | May 12, 1925 |
| 1,562,455 | Jones | Nov. 24, 1925 |
| 1,642,188 | Younghusband | Sept. 13, 1927 |
| 1,841,933 | Bowers | Jan. 19, 1932 |
| 1,869,636 | Warner | Aug. 2, 1932 |
| 1,973,433 | Foster | Sept. 11, 1934 |
| 2,055,389 | Rosenberg | Sept. 22, 1936 |
| 2,179,669 | Parkin | Nov. 14, 1939 |
| 2,358,953 | Valentine | Sept. 26, 1944 |